United States Patent [19]
Das et al.

[11] Patent Number: 6,027,696
[45] Date of Patent: Feb. 22, 2000

[54] FLUIDIZED CATALYTIC CRACKING APPARATUS

[75] Inventors: Asit Kumar Das; Debasis Bhattacharyya; Sukumar Mandal; Vutukuru Lakshmi Narasimh Murthy; Sanjeev Singh; Marri Rama Rao; Sobhan Ghosh, all of Faridabad, India

[73] Assignee: Indian Oil Corporation Ltd., Bandra, India

[21] Appl. No.: 08/843,287

[22] Filed: Apr. 11, 1997

[51] Int. Cl.⁷ ........................................ F27B 15/14
[52] U.S. Cl. ........................ 422/144; 422/139; 422/146; 422/147; 165/104.16
[58] Field of Search ................. 422/139, 141, 422/143, 144, 145, 146, 147; 165/95, 104.16

[56] References Cited

U.S. PATENT DOCUMENTS 4,336,160  6/1982  Dean et al. ........................... 422/144
4,481,103  11/1984  Krambeck et al. ..................... 208/120
5,284,575  2/1994  Owen ................................... 208/161

FOREIGN PATENT DOCUMENTS 9424508  10/1994  WIPO .

*Primary Examiner*—Hien Tran
*Attorney, Agent, or Firm*—Venable; George H. Spencer; Ashley J. Wells

[57] ABSTRACT

A fluidized catalytic cracking apparatus for catalytically cracking a heavy hydrocarbon feed to lighter products includes a regenerator shell for heating spent catalyst, the regenerator shell having a bottom riser for introduction of the heavy hydrocarbon feed, a catalyst, and steam, and from which flows a stream, the bottom riser having a distributor for allowing the stream from the bottom riser to be distributed into a plurality of reaction tubes positioned within the regenerator shell; a catalyst separator connected to an upper end of the regenerator shell; a stripper connected to the catalyst separator to cause a stripping of the catalyst and the spent catalyst feed to the regenerator shell; and an air inlet provided in the regenerator shell so as to cause a combustion within the regenerator shell.

8 Claims, 2 Drawing Sheets

FLUIDIZED CATALYTIC CRACKING APPARATUS

BACKGROUND OF THE INVENTION

1. Field of the Invention

This invention relates to fluidized catalytic cracking process and apparatus for resid in general and heat integration of reaction-regeneration sections of the resid FCC unit in particular.

2. Description of the Related Art

Prior Art

Fluidized catalytic cracking (FCC) is one of the most important conversion processes in the refining industry. FCC was initially designed for a silica-alumina matrix type catalyst with a dense bed reactor-regenerator system. However, since the introduction of zeolite type catalyst, the FCC reactor has been converted to all riser cracking with significant reduction in riser residence time and catalyst inventory.

With further improvement in the catalyst composition, FCC could be run at higher metal level (5600–7000 ppm Nickel and Vanadium) on an equilibrium catalyst. Simultaneously, for reduction of bottom of the barrel, conventional FCC units were modified for handling heavy residue, e.g., atmospheric and vacuum resid, etc. The modification involved the improvement in feed atomization, quick riser termination and quench, better catalyst stripping, two stage catalyst regeneration, external catalyst cooler, catalyst and air distributors etc.

In a resid FCC unit, the feed is preheated to 150–250° C. and injected radially at the bottom of the riser with steam as a dispersing medium. The contact time of the riser is kept in the range of 2–6 secs and the temperature in the riser bottom and top normally remains around 540–580° C. and 500–540° C. respectively. Suitable riser terminator devices are attached at the end of the riser to quickly disengage the catalyst from the product vapor. The catalyst is guided to a bubbling bed stripper where steam at the rate of 2–5 kg/1000 kg of catalyst is injected at the bottom of the stripper to remove the entrapped hydrocarbon vapor from the catalyst. The product vapour after the riser terminator is quenched or guided to the second stage cyclone and finally to the main column fractionator. The stripper catalyst is fed to the 1st stage of regenerator which works in the temperature range of 650–690° C. The carbon on catalyst is significantly reduced (70–80%) in this stage which then is pneumatically conveyed to the second stage regenerator where the temperature is kept much higher (710–740° C.) with sufficiently excess oxygen for near complete removal of carbon (<0.05%) on catalyst. The regenerator catalyst from the second stage of the regenerator is fed to the riser bottom through a regenerated catalyst slide valve where the catalyst circulation rate is controlled to maintain the riser top temperature. Typically the resid FCC unit operates at a 5–8 cat/oil ratio. In some resid FCC units where the quality of resid (Conradson cokes 3–4%), the catalyst in the regenerator is cooled in an external catalyst cooler to maintain over all heat balance of the unit.

Although many modifications in the original FCC unit have been made earlier to process residues, such resid FCC units can not handle very heavy residues where the Conradson carbon is more than 6–8% and metal level (Ni+V) on feed is higher than 30–50 ppm. Several problems are associated in the known resid FCC units to economically process resid. These problems are as follows:

i) Excessive coke with the resid produces a large amount of excess heat and therefore the heat balance of the reactor regenerator is disturbed.

ii) Higher metal level on the resid leads to significant deactivation of the catalyst and requires a very large catalyst addition rate to keep the metal level on equilibrium catalyst in an acceptable range.

iii) Crackability of some of the residue, in particular aromatic residues, are not quite good. Sufficient residence time for such residues are required in the riser and the extra coke generated from such aromatic residue cracking is required to be handled.

iv) Poor strippability of the catalyst: Strippability of the heavier unconverted residue inside the catalyst pores is not at all efficient.

v) $SO_2$ emission from present resid FCC units are very high and present resid FCC conditions are not very conducive for efficient functioning of $SO_x$ removal additives.

vi) $NO_x$ generation in present resid FCC unit is quite high due to high temperature regeneration.

These problems are further discussed in the following sections.

EXCESS COKE FORMATION ASSOCIATED HIGHER REGENERATION TEMPERATURE

Coke make in FCC is the most critical parameter to maintain the heat balance. Coke produced in the riser is burnt in the presence of air in the regenerator. The heat produced through exothermic coke burning reactions supplies the heat demand of the reactor i.e., heat of vaporization, and associated sensible heat of the feedstock, endothermic heat of cracking etc. Typically, the coke yield in a conventional FCC unit with vacuum Gas Oil remains in the range of 4.5–5.5 wt. %. The heat produced from burning (complete combustion) is sufficient to supply the reactor heat load. However, in a resid FCC unit, since the feedstock contains large amounts of coke precursors with higher amounts of Conradson coke and aromatic rings, the coke make is significantly increased which in turn increases regenerator temperature from 650–860° C. in conventional FCCUs to 720–250° C. in residue crackers.

The higher regenerator temperature has multiple delitarius effects in resids FCC units. However, the following are the major issues involved in high temperature regeneration:

i) Higher regenerator temperature reduces the catalyst circulation rate for a given riser top temperature to maintain in the reactor heat balance. Thus, the effective cat/oil ratio drops significantly resulting in reduced conversion.

ii) Higher regenerator temperature significantly increases catalyst deactivation both due to the metal, as well as hydrothermal factors. In fact, a regenerator temperature beyond 700° C. exponentially increases the zeolite crystallinity loss which is further aggravated in the presence of vanadium impurities on catalyst. The maximum vanadium level which can be tolerated in the FCC depends on the regenerator temperature. The tolerable vanadium level can be significantly improved by 4–5 times if regenerator temperature is reduced from say 730° C. to 680° C. Similarly, hydrothermal deactivation of catalyst also drops significantly with regenerator temperature reduction.

iii) Higher regenerator temperature is not conducive for $SO_x$ additive which works better at moderate regenerator temperatures (680–700° C.). Similarly, $NO_x$ emission is significantly increased beyond regenerator temperature of 720° C.

iv) Higher regenerator temperature requires better lining and metallurgy of the regenerator which increases the capital expenditure.

Therefore, it is essential to keep the regenerator temperature within limits below 700° C. and preferably within 680–690° C. to minimize the above damaging effects but at the same time without reducing the coke burning rate to less than an acceptable level. Unfortunately, most of the present resid FCC regenerators operate at high temperatures in complete combustion mode. Regenerator temperature to some extent can be reduced by partial combustion of the coke and by installing a CO boiler to take care of the unconverted carbon monoxide. However, with partial combustion regenerators, particularly at very high coke on catalyst as in resid FCC, it is difficult to maintain the uniformity of bed temperature and after burning. Also, the catalyst inventory required to maintain sufficient residence time of the catalyst in the regenerator goes up with a reduced coke burning rate at lower temperatures. Therefore, running a partial combustion regenerator with resid spent catalyst is not commonly observed nowadays.

Another way to control the regenerator temperature in resid FCC, is use of an external catalyst cooler with a suitable cooling capacity; regenerator temperature may be reduced by 20–30° C. However, a catalyst cooler is not desirable normally from the heat efficiency point of view since the steam is generated in the cooler essentially at the cost of feedstock.

An important point to note is that the present resid FCC units, even with a catalyst cooler, can handle feed Conradson coke upto 6–8 wt. % maximum residues heavier than this level, which can not be processed within the scope of existing resid FCC technology. Therefore, controlling the regenerator temperature is one of the key issue in resid FCC operation.

HIGH METAL LEVEL AND CATALYST DEACTIVATION

Residues contain large amounts of undesirable metals, e.g., Vanadium, Nickel, Sodium, Iron, Copper, etc. which are poisonous to the catalyst activity and selectivity. The poisoning effect of these metals aggravates exponentially at higher regenerator temperature. Recent residue crackers operating at high regenerator temperature (>720° C.) can tolerate maximum of 5000–8000 ppm of Nickel and Vanadium on the equilibrium catalyst. This ultimately raises the catalyst addition rate for bad quality of residue with higher metal content. Although Nickel poisoning may be eliminated by using suitable Nickel passivators effectively, the same is not true for vanadium.

Another important issue on metal poisoning is that most of the known resid crackers operate with close to zero carbon level on the regenerated catalyst. This has been found to be actually favorable for vanadium poisoning reaction. It has been proved earlier that (Ref ACS Symposium on Reduce Crude Cracking Catalyst by Ashland) maintaining a small but finite amount of coke on the regenerated catalyst is important to minimize oxidation beyond $V_2O_4$ to $V_2O_5$ with ultimately poisoning of Zeolite active sites. Therefore, one way to improve the vanadium tolerance of the catalyst is to not bottom the coke on catalyst to zero level.

The third important issue on metal poisoning originates from the inefficient stripping of the catalyst. Present FCC strippers operating in bubble bed are not very efficient at removing entrapped hydrocarbons from the catalyst. The problem becomes more acute with residue resulting in more carry over of unstripped hydrocarbons to the regenerator. Also a lot of steam injected at the bottom of the stripper actually bypasses to the regenerator. Such steam present in the regenerator deactivates the acid sites of the catalyst much faster particularly at high regenerator temperature.

CRACKABILITY OF AROMATIC RESIDS

Residues particularly aromatics, are not easily crackable in the present riser condition. The average temperature of the present risers are in the range of 540–560° C. which is not enough to vaporize the residues completely. Moreover, the residence time in the riser is also quite low (2–6 secs) which may not be sufficient to crack the stable aromatic compounds. Also, it is known that a lot of the active sites are instantaneously deactivated at the riser bottom due to what is called "con.coke poisoning" of the zeolite pore mouth. It is thus believed that the present riser conditions are not sufficient to crack aromatic heavy fractions substantially. High temperature and residence time are to be kept to allow such aromatics to be cracked in the risers, as well as near complete vaporization of the residues to reduce coke make.

POOR STRIPPING EFFICIENCY WITH RESID

The known resid FCC strippers are not considered efficient. It is observed commercially that the optimum stripping steam requirement for resid operation is 3–4 times more than that for corresponding clean feedstocks. This is because the heavier components of the resids are not easily strippable from the catalyst pores due to their relatively lower diffusion rates. Also, at the present stripper temperature of 510–530° C. a lot of unvaporized hydrocarbons remain in the liquid phase inside the catalyst pores which are very difficult to strip in bubble bed mild stripping conditions.

One way to increase the stripping efficiency, particularly for resid operation was proposed by Krambeck et al. in U.S. Pat. No. 4,481,103 where the stripper temperature was enhanced by circulation of regenerated catalyst partially in the stripper. The higher stripper temperature helps to remove the entrapped hydrocarbons more efficiently.

Still another way to improve the catalyst stripping was suggested very recently by H. Owen in U.S. Pat. No. 5,284,575. The concept of fast fluidized bed, stripping is outlined in this Patent which addresses bad contacting of the bubbling bed stripping and proposes a high velocity efficient catalyst stripping. Nevertheless, such fast fluidized stripping also may not be fully adequate unless that stripping temperature is kept particularly for resid hydrocarbon where the unstripped material also contains components in liquid phase. Therefore, increasing stripper temperature and steam velocity are the two key issues to improve overall stripping efficiency for residue crackers.

HIGHER $SO_x$ AND $NO_x$ GENERATION $SO_x$ and $NO_x$ generation in residue crackers are much higher than in conventional FCC units. This is partly due to higher regenerator temperature in resid cracking as outlined previously. $SO_x$ additives which are used for reduction of $SO_x$ in flue gas, also loses efficiency at high regenerator temperature. Similarly, CO promoter additives, used in high temperature regenerators for resid, also retards the effectiveness of $SO_x$ additives. Poor stripping efficiency does not allow proper hydrolysis of the $SO_x$ additive in the stripper and thus badly affect the performance of this additive.

$NO_x$ generation is substantially increased with higher regenerator temperature (>710° C.). The situation become more critical if hot spots are generated in the regenerator bed due to inefficient axial and radial mixing. Increasing excess oxygen level may also contribute to the generation of $NO_x$ level. Therefore, from $SO_x$ and $NO_x$ generation point of view, todays high temperature dense bed regenerators are not at all efficient. Similarly, the efficiency of $SO_x$ additives are also not found sufficiently good in present regenerator conditions. Therefore, to improve the $SO_x$ and $NO_x$ emission, resid FCC regenerators must address the high temperature and non-uniformity in bed profiles of existing resid regenerators.

Therefore, much of the problems faced by present resid cracking units originate in excess heat generation due to extra coke and inefficient heat balance between the reactor and regenerator. Although, catalyst coolers are beneficial to reduce the regenerator temperature to some extent, the excess heat required to be removed, particularly for very heavy residues, demand an extremely large cooling capacity means which are to mechanically installed outside the regenerator. Moreover, use of catalyst coolers makes the overall system less energy efficient since the steam generated in the cooler is at the cost of the feedstock itself.

Another approach followed recently is described in U.S. Pat No. 4,336,160 by Dean et al. The first stage of the regenerator operates at lower temperature (650–675° C.) and the second stage operates at much higher regenerator temperature (720–740° C.). Although, it is claimed that the staging of the regenerator helps for reducing hydrothermal deactivation of the catalyst, ultimately the catalyst addition rate is not reduced effectively. This is because the overall catalyst inventory in the two stage regenerator is relatively higher than the single stage regenerator. Therefore, to reduce the catalyst addition rate it is not only important to reduce the catalyst deactivation but also the overall catalyst inventory should be as less as possible. Another, major draw back in the two stage regeneration, is that the flue gas of the first stage contains sufficient CO which needs to be burnt to $CO_2$ in a separate incinerator, thus adding to the overall capital expenditure.

The most important of all, is the fact the known resid cracker are able to handle only mild resids with limited CCR (up to 5–8%) and metals. It is absolutely necessary to improve the heat and metal management of the system for processing heavier residues in a profitable manner.

The difficulty in resid FCC is that the riser/reactor and stripper temperatures should be maximized where as the regenerator temperature is to be minimized. This does not happen at all in conventionally heat balanced operations since any increase in the riser temperature essentially leads to an increase in the regenerator temperature also. Therefore, any new configuration where the gap between the riser/stripper and the regenerator temperature is brought down from the present level of 200–230° C. to a lower value is going to be highly desirable.

SUMMARY OF THE INVENTION

DESCRIPTION OF INVENTION

According to this invention, there is provided a fluidized catalytic cracking process wherein a heavy hydrocarbon feed comprising hydrocarbons having a boiling point above 350° C. including heavy residues is catalytically cracked to lighter products by a fluidizable cracking catalyst comprising in the steps of:

a) introducing said catalyst and feed in a bottom riser and allowing the catalyst and feed to preaccelerate upwardly within said riser:

b) the catalyst and hydrocarbon vapor mixture formed in said riser flowing upwardly through a plurality of microriser tubes disposed within a regenerator shell and so as to cause a cracking reaction of said hydrocarbon;

c) allowing a simultaneous combustion of the coked catalyst within said regenerator and causing a regeneration of the catalyst and a heat transfer to said microriser tubes;

d) the vapors from said microriser tubes passing through a catalyst separator and stripper;

e) the spent coked catalyst being introduced into said regenerator.

Further according to this invention, there is provided a fluidized catalytic cracking apparatus for catalytically cracking a heavy hydrocarbon feed to lighter products comprising a regenerator for heating spent catalyst, said regenerator having a bottom riser for introduction of the feed, catalyst and steam, said riser having a distributor for allowing the stream from said bottom riser to be distributed into a plurality of microriser tubes extending within said regenerator, a catalyst separator connected to the upper end of said regenerator, a stripper connected to said separator to cause a stripping of the catalyst and the coked catalyst feed to the regenerator shell, air inlet provided in said regenerator so as to cause combustion within said shell.

We have now found a way to achieve the twin objective of heat and metal management in a novel catalytic cracking configuration where the reactor regenerator and the stripper operates in fast fluidization regime and the reactor is disposed within the regenerator for sufficient exchange of heat. Such a system helps to intensity the heat balance further and is able to synergise the exothermic regenerator and endothermic cracking reaction in a single vessel with sufficient heat transfer capacity which reduces the regenerator temperature while increasing the riser and thus the stripper temperatures to the desired level. Such a system obviates the difficulties encountered in conventional residue cracking units.

The present invention provides a fluidized catalytic cracking process where, in a heavy hydrocarbon feed comprising hydrocarbons having a boiling point above 350° C. and more suitably above 450° C. including heavy residues, is catalytically cracked to lighter products by contact with a circulating fluidizable cracking catalyst inventory consisting of particles having a size ranging from 20 to about 100 microns and fines of cracked catalyst particles having a smaller particle size, comprising catalytic cracking said feed in a catalytic cracking riser reactor operating at catalytic cracking conditions by contacting feed with a source of the riser at a superficial vapour velocity such as ¼–6 m/sec and distributing the catalyst and vapor mixture after a preacceleration zone at the riser bottom through a multichannel distributor directly connected to the tube assembly, through which the vapor and the catalyst mixture rises at a velocity of 2–3 m/sec and said tube assembly is immersed in the regenerator shell where the coked spent catalyst after reaction and stripping is burnt in the presence of air producing sufficient heat and the heat is allowed to transfer to the tube side through the tube walls whereby the catalyst and hydrocarbon vapor mixture get further heated but at the same time producing a cooling effect in the regenerator so as to maintain the regenerator temperature within 700° C. and more preferably within 650–680° C. and thus managing the overall system more efficiently, the catalyst and hydrocarbon mixture after reaction inside the tube, get reassembled at the top of the integrated riser regenerator set up and pass to the stripper shell wherein the catalyst is separated from the vapor in the typical separator device, e.g., cyclone or inertial or ballistic separator, and the vapor after separation is directly allowed to pass to the second stage cyclone or in a vented fashion and finally is directed to the fractionator, whereas the catalyst after separation falls into a two phase stripper top where the center of the stripper is run at fast fluidized phase of superficial velocity of 1.5 m/sec by injected steam at the bottom of the central past of the stripper and the overflown catalyst is further stripped in the bubbling bed with more steam at a superficial velocity of 0.1–0.4 m/sec and the stripped catalyst is passed through a slide valve to the bottom of the regenerator vessel where in combustion air is blown at the bottom through pipe grid air distributor in the shell side of the regenerator-riser assembly in the superficial velocity range of 1–3 m/sec and maintaining the $CO/CO_2$ ratio of flue gas in the range of 0.6–1.2 so that the heat generation is reduced and the above said flue gas is passed to a CO boiler for further heat recovery after its separation from the entrained catalyst in internal and/or external multistage cyclone devices and the catalyst thus regenerated is taken at the regenerated top, down to the riser bottom via a down cover and the regenerated catalyst slide valve to complete the internal circulation loop of the catalyst.

In an apparatus embodiment, the present invention provides an apparatus for the fluidized catalyst cracking of heavy hydrocarbon in an integral fashion, wherein riser and regenerator are kept in one integrated vessel, wherein the tube side sees the flow of hydrocarbon vapor and the regenerated catalyst in one hand, whereas the shell side accomplishes the combustion of coke present in the spent catalyst with combustion air, and both the reaction and regeneration zones operate in fast fluidized regime with an initial preacceleration zone for the hydrocarbon and the catalyst mixture at the riser bottom which then passes to a distributor and the catalyst tube where heat transfer through the overall heat transfer through the wall takes place to facilitate the overall heat management and the overall residence time in the riser tube is kept at an optimal range of 2–15 secs, and the reaction products through different tubes are reassembled at the top of the regenerator-riser vessel, through which the cracked product and the unstripped catalyst passes to the riser terminates device whereas in the shell side the combustion air is injected through pipe grids and at the top is separated from the tube side assembly and the entrained catalyst is separated in the external/internal cyclone, a lower inlet from cyclone dipleg back to the regenerator shell of reaction products and catalyst mixture at the top of the regenerator vessel connected to riser terminator and an inlet for spent catalyst entry to the regenerator shell at middle level elevation after stripping is over in the catalyst stripper separately located from the regenerator riser vessel.

The fluidized catalytic cracking apparatus may include tubes disposed in a spaced relationship to each other and heated by the combustion within the shell. The distributor may comprise a chamber at the lower end of the regenerator and separated from the shell. The distributor is preferably in flow communication with the bottom riser. The fluidized catalytic cracking apparatus may further comprise a reducer assembly provided at the upper end of the regenerator. The microriser tubes have a continuously increasing cross-sectional area. The ratio of net cross-sectional area at the top and bottom of each microriser tube is between 2 and preferably 3 to 5.

DETAILED DESCRIPTION OF PREFERRED EMBODIMENTS

Figure 1:
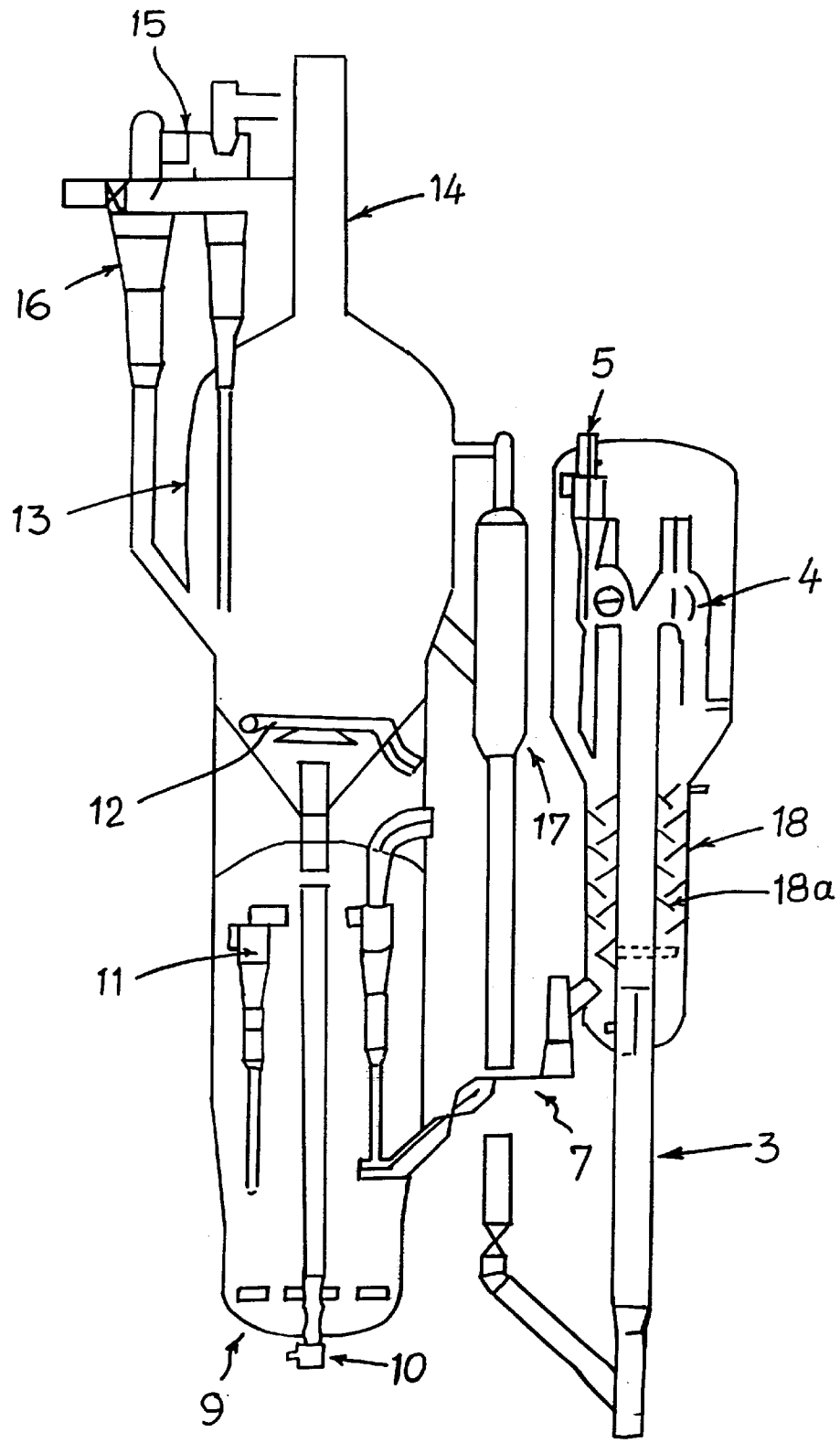
FIG. 1 shows a simplified view of an FCC unit of the prior art with conventional two stage regenerator, riser and stripper assembly.

FIG. 1 is a simplified schematic view of an FCC unit of the prior art which is similar to a Stone and Webster two stage resid FCC unit.

Figure 2:
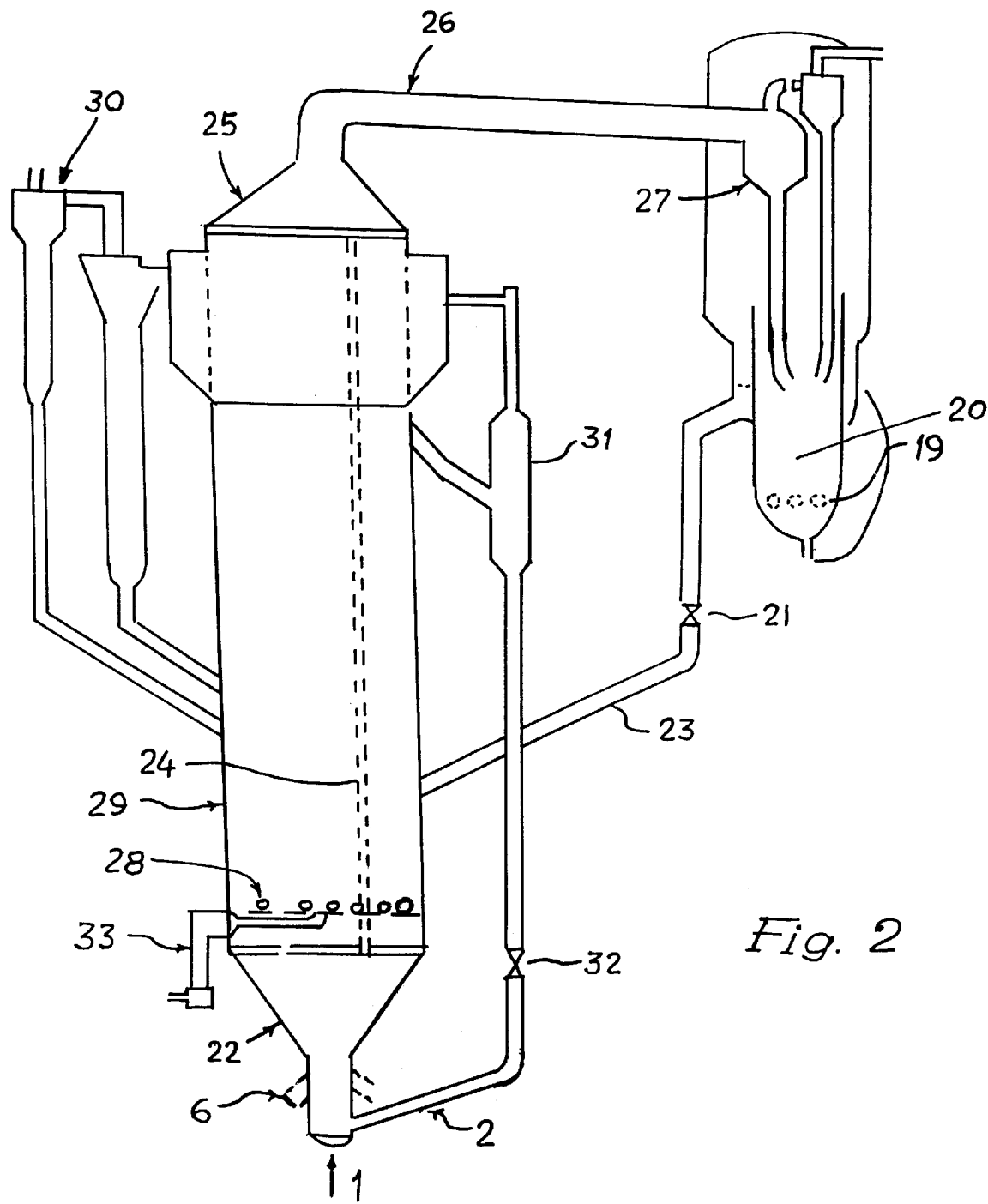
FIG. 2 shows an integrated regenerator riser and the stripper assembly of the present invention showing the interconnection of catalyst loop.

A heavy feed such as vacuum gas oil along with residue components (boiling above 550° C.) is injected through radial feed injection nozzles at different heights of the riser. Fresh feed and recycle streams are injected at different riser heights to preferentially crack the heavy components selectively. Prior to injection of the feed through nozzles, dispersion steam is used to preatomize the feedstock in the high efficiency feed nozzle. Also, steam is injected at the riser bottom to preaccelerate the regenerated catalyst up to certain riser heights. The catalyst and feed after mixing pass through the vertical riser 3 where a typical superficial vapor velocity of 5 m/sec is maintained to avoid catalyst slipping downwards to the riser. Typical residence time of vapor in conventional riser is kept in the range of 2–10 secs. After the catalyst and hydrocarbon vapor reach the riser top, they are quickly separated through suitable riser terminators e.g., rough cut cyclone or Ramshorn separator 4 where the catalyst is guided to fall down to the stripper and the vapor is directed right up to the reactor cyclone 5 for further separation of the catalyst fines. The catalyst from the reactor cyclone and primary separator falls into catalyst stripper 18, where steam is injected at different stripper height and moves up counter current to the down coming catalyst through angular baffles 18a. After stripping of the hydrocarbons, the spent catalyst goes to the regenerator via spent catalyst slide valve 7 and stand pipe enters into the bottom of the first stage regenerator. Combustion air is blown at the regenerator bottom via pipe grid 9, past which also helps in lifting the catalyst from first stage to the second stage regenerator via a central duct 10. The combustion gas in the first stage contains a significant portion of CO which is separately burnt in a CO regenerator after separating catalyst fines from the flue gas in multistage cyclones 11. Secondary combustion air 12 is injected in the second stage regenerator 13 bottom where total combustion is achieved. The flue gas from the second stage regenerator goes to a plenum chamber 14 and finally to external/internal cyclone 15,16 for separating the entrained catalyst. The regenerated catalyst is withdrawn at the middle of second stage regenerator which passes through a deaerator 17 and regenerated catalyst slide valve 7 to the bottom of the riser. Present resid FCC units also include catalyst coolers which is not shown in the present diagram. In FIG. 2 the regenerated catalyst enters the riser bottom through regenerated catalyst stand pipe 2 and steam is injected at the bottom of the riser 1 to preaccelerate the catalyst in the upward direction. Feed is injected via radial distributors at different riser heights 6 for separately injected fresh and recycle streams. The riser then goes to the tube bundle distributor 22 with casted channels opening right at individual reaction tubes 24 through which the catalyst and hydrocarbon mixture is passed upward at typical superficial velocity in the range of 2–3 m/sec. The number of reaction tubes will depend on the amount of heat transfer desired. The tube bundles are reassembled together through a mirror image cast assembler or reducer assembly 25 to a common riser manifold 26 which then is directed through primary 27 and secondary catalyst separators. The product vapour is then directed to the main fractionator for separation. The spent catalyst via the separation and cyclone dipleg falls to the stripper.

The fast fluidized stripper has fast fluidization Zone 19 and a conventional bubbling zone 20. The steam is injected at the bottom of the stripper. However, the present invention does not necessarily require fast fluidized stripping and it can also be used in a conventional stripper as described in FIG. 1. Since the present invention is intended to handle very heavy feedstock and the stripper performance is one of the most critical step to reduce coke make, use of fast fluidized stripper will lead to better control of strippable coke and thus has been preferred in the new invention. The spent catalyst comes back to the regenerator bottom's only one stage is required in the present invention via slide valve 21 and stand pipe 23.

In the present invention, the riser and the regenerator are kept in one vessel in an integrated manner. The cracking of hydrocarbon is accomplished inside the tubes whereas the combustion of coked catalyst is done in the shell side 29 where combustion air is injected at the bottom of the shell side through concentric pipes 28 and blower 33. Air rate is maintained in such a way that only coke is burnt partially keeping a CRC level of 0.15–0.25% on catalyst and $CO/CO_2$ level of 0.8 the flue gas. In order to reduce the overall catalyst inventory in the system, the regeneration is carried out in a fast fluidized regime of 1–3 m/sec and preferably in 1.5–2.5 m/sec superficial air velocity where the burning kinetics, heat transfer, and catalyst erosion are controlled most optimally. Better fluidization of particles in fast fluidization of regime also helps in avoiding mal-distribution of temperature and thus reduce $NO_x$ emission. The flue gas from the regenerator flows through multistage external cyclone 30 or internal cyclone (not shown) to separate the entrained catalyst fines. Finally, the flue gas is directed to a CO boiler to recover the additional heat available in the flue gas as well as to burn off CO to acceptable levels. The regenerated catalyst is withdrawn at the top of the regenerator shell and passed through deaerator 31 and slide valve 32 down to the riser bottom. Specific conditions of different sections in the inventions are discussed below.

FCC RISER AND MICRORISER CONDITIONS

The present invention can be applied for riser or dense phase reaction conditions although the embodiment as shown in FIG. 2 only highlights the riser condition. The same concept may well be implemented for dense bed cracking although risers are most preferred. Typical conditions at the bottom of the riser are similar to those of conventional risers except that the cat/oil ratio is in the range of 4:1 to 6:1 as compared to 6:1 to 10:1 in conventional risers (i.e., a reduction by about 3%) and the temperature of the regenerated catalyst is in the range of 650–700° C. and most preferably 670–690° C. as compared to 700–740° C. for conventional resid cracking. Typical vapor velocity at the riser bottom is in the range of 5–15 m/s. Operating conditions at the riser bottom are given below:

|  | Conventional | Present Invention |
|---|---|---|
| Cat/oil ratio | 6–10 | 4–6 |
| Bottom Temperature after feed mixing | 540–580° C. | 530–560° C. |
| Vapor Velocity, m/s | 5–15 | 5–15 |

However, just after mixing with the feed, the hydrocarbon and catalyst mixture is passed through a number of microrisers consisting of metal tubes immersed in the regenerator shell to facilitate better heat transfer. The conditions at the microriser bottom and top are typically expected to be in the range of

|  | Bottom | Top |
|---|---|---|
| Superficial vapor velocity | 2–4 | 3–5 |
| Temperature deg C. | 520–550 | 570–600 |

It is important to note that the vapor velocity in the microrisers is considerably lower as compared to the bottom riser section. This, however, will not increase the catalyst slip much due to much lower opening of the microrisers. The overall contact time of the vapor in the microriser is of the order of 2–15 secs and must preferably 6–10 secs which is about 20% higher as compared to conventional FCC units. The higher riser temperature in the microriser is due to effective heat transfer through the tube wall and helps the dual purpose of cooling the regenerator and increasing the temperature for crucial cracking reactions. Since the temperature profile in the microriser is completely opposite to the existing riser temperature profile, it gives a different kind of product selectivity compared to conventional FCC unit. The microriser configuration due to its higher temperature placed from the riser and the stripper in the present invention is therefore not annular in any way with the riser. However, if a fast fluidized stripper is employed as shown is FIG. 2, one annular concentric pipe may be placed to separate the bubbling zone from the fast fluidization zone. The typical superficial velocity in the fast fluidization zone may be 0.8–1.5 m/s and in the bubbling zone 0.1–0.3 m/s. In the present invention, a bubbling zone is mostly avoided or kept at a bare minimum for smooth flow of catalyst through the stand pipe. This helps to considerably reduce the catalyst inventory and accomplishes catalyst stripping under only fast fluidized conditions. One of the most important consideration in the present invention is higher reactor temperature and consequently higher stripper temperature. The relatively very high stripper temperature of 575–600° C. is helpful in efficient removal of the hydrocarbon and considerably reduces the residence time requirement of the stripper. Therefore, the present invention does not involve any bubbling bed stripping and reduces the strippers catalyst inventory almost 70% as compared to conventional and other fast fluidization strippers, and leads to more olefinic products and consequently gasoline octane and LPG olefins are significantly improved. Moreover with flexible control of catalyst circulation and the riser bottom temperature, it could be possible to vary the operating severity of the unit. It is important to note that the heat balance of reactor and regenerator in this integrated system is much more complex than the existing FCC units and the regenerator performance has a direct bearing an the coke on the catalyst but also directly supplying heat to the reactor.

FCC REACTOR

The conditions in the reactor shell are similar to conventional units. The reactor shell should be as small as possible to avoid unnecessary thermal cracking and the riser terminator should be designed with the state of the art technology so that vapor residence time in the reactor shell is minimized. The FCC reactor conditions 'per se' are conventional and form no part of the present invention.

FCC STRIPPER CONDITION

In the present invention, the riser must be kept inside the regenerator shell and therefore the stripper is separately placed from the riser and the stripper in the present invention is therefore not annular in any way with the riser. However, if a fast fluidized stripper is employed as shown in FIG. 2, one annular concentric pipe may be placed to separate the bubbling zone from the fast fluidization zone. The typical superficial velocity in the bubbling zone is 0.1–0.3 m/sec. In the present invention, a bubbling zone is mostly avoided or kept at bare minimum for smooth flow of catalyst through the stand pipe. This helps to considerably reduce the catalyst inventory and accomplishing the catalyst stripping under only fast fluidized conditions. One of the most important considerations in the present invention, is higher reactor temperature and consequently higher stripper temperature. The relatively very high stripper temperature of 575–600° C. is helpful to remove the hydrocarbon and considerably reduce the residence time requirement of the stripper. Therefore, the present invention does not involve any bubbling bed stripping and reduces the stripped catalyst inventory almost 70% as compared to conventional and other fast fluidization stripper. Steam is also injected at the bottom of the fast fluidized stripper to avoid the stagnation zone and improve the stripping efficiency further. The overall steam requirement in this fast fluidized stripper is equal to or even lesser than the conventional stripping.

The following stripper conditions are applicable for the present invention.

Vapor velocity in the central zone m/s 0.8–1.5

Central tube velocity m/s 1.5–2

Vapor velocity in the stand pipe 0.1–0.2

Stripper temperature deg C. 570–600

Stripper catalyst residence time,secs 10–30

In the new design, the central tube inside the stripper helps to keep the internal circulation of the catalyst almost in riser-like flow. Where intense stripping is carried out, it is possible to cut down the inventory in the stripper considerably.

FCC REGENERATOR CONDITIONS

The regenerator design in the present invention is quite different as compared to conventional regenerators. The combustion of coke takes place in the shell side of the regenerator-riser assembly where air is first distributed at the bottom of the regenerator shell. The following range of process parameters are applicable in the new regenerator Superficial Gas velocity m/sec 0.8–2.0

Overall catalyst residence time sec 1–10

Temperature:
   Bottom °C. 630–680
   Top °C. 660–720
   Cyclone ° C. 670–730

Flue Gas $CO/CO_2$ 0.4–2

It is seen that the regenerator should essentially operate in the fast fluidization regime. As a result, the burning rate of coke is significantly improved at least 3–5 times as compared to conventional dense phase burning. Moreover, CO being an intermediate, is also expected to be maximum in the fast fluidized regenerator. The improvement in the burning rate actually reduces the catalyst inventory significantly (⅓rd of dense bed) and higher $CO/CO_2$ helps to control the heat balance much better since additional heat released by after burning of CO to $CO_2$ could be minimized. The fast fluidized regenerator is relatively much longer in height and smaller in diameter as compared to conventional dense bed regenerators.

Due to fast fluidization, the oxygen, coke and temperature profiles are radially quite uniform and thus avoid $NO_x$ formation. Also $CO/CO_2$ is maximized in the fast fluidization regenerator without giving unnecessary after burning problems as faced in conventional regenerators. Moreover, the radial catalyst distribution problems of dense bed is also avoided in this design since the diameter of the regenerator is much lower. This actually improves the specific coke burning efficiency and helps to cut down catalyst inventory significantly.

As discussed earlier, the effective heat transfer from the combustion zone to inside the microriser tubes, helps in a large way to reduce the regenerator temperature and most importantly in the after burning section. Therefore, within the maximum regenerator temperature of about 700° C., this unit can handle about 9–12 wt % coke yield (fresh feed basis) vis-a-vis 4–6% coke in conventional single stage regenerators without catalyst coolers.

The lower regenerator temperature thus attained by integrating the riser and regenerator, actually improves the heat management in a significant way which is crucial particularly for resid type feedstock.

Air rate in the regenerator bottom is set in order to just maintain the stoichiometric burning rate and controlled based on the temperature difference between the dilute phase and the bottom of the regenerator.

FCC FEED

Any conventional FCC feed can be used. The process of the present invention is especially useful for processing difficult charge stocks with high Conradson carbon exceeding 2,3,5 or even 10% CCR. The process, due to its efficient heat balance, is able to tolerate very heavy feedstock with higher metal level of even 50 ppm and above of Nickel and vanadium. The process is also able to tolerate high Nitrogen in feeds even up to 5000 ppm.

The feed may range from the typical, such as petroleum distillate or residual stock, either virgin or partially refined, such as coal oil or shale oil, etc. and including even recycled units. The process is most suitable for long, exceptionally higher CCR and metal which are otherwise very difficult to be processed in conventional resid crackers. Therefore, the present invention extends the tolerance of feed handling capability of catalytic cracking process as such.

FCC CATALYST

Any commercially available FCC catalyst may be used. The catalyst can be 100% amorphous, but preferably includes some zeolite in a porous refractory matrix, such as silica, alumina, clay or similar materials. The zeolite is usually 5–40% on the catalyst with the rest being matrix. Conventional zeolites include X and Y zeolites with ultrastable or relatively high silica, Y zeolites being preferred. Dealuminated Y zeolites may be used. The zeolites may be stabilized with rare earth, e.g., 0.1 to 10% rare earth (RE)

Relatively high silica containing zeolites are preferred for use in the present invention. They have better coke selectivity and metal tolerance. The catalyst inventory may also contain one or more additives, either present as separate additives or mixed in each particle of the cracking catalyst. Additives can be added to enhance particular yields, e.g. ZSM-5 for LPG boosting or metal traps or even for $SO_x$ adsorption. Particularly for heavy feedstocks as being used in the present invention, it is preferred to use additives for bottom upgradation which are usually amorphous active sites with inside to pore sizes and thus have very good accessibility for large resid molecules. Such bottom additives also are very efficient to catch metal, nitrogen, sulphur and other poisonous species which are present in resid in abundant quantity.

CO PROMOTER

The process of the present invention attempts to maximize $CO/CO_2$ ratio in the regenerator so that the heat release is brought to the minimum level. Therefore, the present process does not require any CO promoter addition in the system. The fast fluidization of catalyst in the regenerator makes burning of coke very fast and avoids hot spots. Therefore, CO promoter is not to be added in this process.

CATALYST COOLERS

Catalyst coolers may be used, if desired. However, the process of the invention has excellent tolerance to high CCR content of feed. If the feed CCR goes beyond limit of 10–15%, it may be desirable to add catalyst coolers which are normally placed external to the regenerator. Due to efficient management of heat in the riser-microriser and regenerator section, as well as high temperature, fast fluidized stripping helps to minimize the coke make significantly. Therefore, catalyst coolers would be required only when feed is exceptionally heavier containing very high CCR (>10).

CATALYST MAKE UP

Make up of catalyst in the process of the invention, is significantly reduced due to
(i) reduced catalyst deactivation in the regenerator (lower regenerator temperature, and
(ii) lower catalyst hold up in regenerator and stripper vis a conventional resid FCC units for same quantity feed processing.

Both of the above factors contribute to about a 50% reduction in catalyst make up rate for similar feed qualities and conversion as compared to conventional resid FCC units.

This invention provides a unique process flow scheme for catalytic cracking and coke burning in a single integrated vessel.

In conventional resid crackers (prior art) the riser reactor and the regenerator are placed separately in two different subsystems where no heat transfer is allowed through the wall except negligible heat loss and thereby leads an adiabetic of the overall process. Although, the scheme works for simple feed stockes, it is not suitable for heavy resid stocks due to inefficient heat management resulting in higher regenerator temperature and consequently higher catalyst deactivation and related issues. Moreover, due to regenerator temperature limitation, it is not possible to operate the riser-reactor and stripper at high temperatures which helps resid cracking and stripping in many ways.

In contrast, in the present invention with unique integrated approach as outlined where reaction and regeneration are done in a single vessel with sufficient heat transfer across the tube walls. This unique design combines the exothermic regeneration and endothermic cracking reaction together and effectively reduces the overall heat of reaction of the system.

Due to this efficient heat management, it has been possible to solve two opposing effects in one attempts i.e., reactor stripper temperature could be increased and at the same time regenerator temperature could be brought down. In conventional resid FCC, this never happens by any change what so ever.

The benefit of this integrated approach is immediate reduction in catalyst make up rate and an improved ability of cracking very heavy feedstocks in more economic fashion. Ultimately, the process of this invention will help refiners to upgrade their most difficult bottom of the barrel to most desirable gasoline, middle distillate and LPG.

PRODUCT QUALITY

The process of the present invention is essentially high temperature intensive catalytic cracking. It results in more olefinic LPG where propylene and butylene yield are mimimixed in the in LPG. Gasoline yields have very high octane number. RON will be about 99–102 in the present process due to very high reaction emperature. However, the diesel quality and yields are expected to be inferior. As such, the process is more suitable for producing petrochemical feed stocks e.g. propylene and butylene from very heavy residues.

What is claimed is:

1. A fluidized catalytic cracking apparatus for catalytically cracking a heavy hydrocarbon feed to lighter products, comprising:

a regenerator shell for heating spent catalyst, the regenerator shell having a bottom riser for introduction of the heavy hydrocarbon feed, a catalyst, and steam, and from which flows a stream, the bottom riser having a distributor for allowing the stream from the bottom riser to be distributed into a plurality of reaction tubes positioned within the regenerator shell;

a catalyst separator connected to an upper end of the regenerator shell;

a stripper connected to the catalyst separator to cause a stripping of the catalyst and after which the strippers spent catalyst is fed to the regenerator shell; and an air inlet provided in the regenerator shell so as to cause a combustion within the regenerator shell.

2. The fluidized catalytic cracking apparatus as claimed in claim 1, wherein the reaction tubes are disposed in a spaced relationship to each other and heated by the combustion within the regenerator shell.

3. The fluidized catalytic cracking apparatus as claimed in claim 1, wherein the distributor comprises a chamber provided at a lower end of the regenerator shell and separated from the regenerator shell.

4. The fluidized catalytic cracking apparatus as claimed in claim 3, wherein the distributor is in flow communication with the bottom riser of the regenerator shell.

5. The fluidized catalytic cracking apparatus as claimed in claim 2, further comprising a reducer assembly provided at an upper end of the regenerator shell.

6. The fluidized catalytic cracking apparatus as claimed in claim 2, wherein the reaction tubes have a continuously increasing cross-sectional area.

7. The fluidized catalytic cracking apparatus as claimed in claim 2, wherein the reaction tubes have respective top and bottom portions which have respective cross-sectional areas, and wherein the reaction tubes have a ratio of net cross-sectional area at the top and bottom of each reaction tube which ranges between 2 and 5.

8. The fluidized catalytic cracking apparatus as claimed in claim 7, wherein the reaction tubes have a ratio of net cross-sectional area at the top and bottom of each reaction tube which ranges between 3 and 5.

* * * * *